United States Patent

Holliday et al.

Patent Number: 6,160,060
Date of Patent: Dec. 12, 2000

[54] PROCESS FOR THE SYNTHESIS OF HIGH MOLECULAR WEIGHT PREDOMINANTLY AMORPHOUS POLYMERS WITH IMPROVED COLOR AND ADHESIVE PROPERTIES

[75] Inventors: Robert E. Holliday; Horst K. Seeger, both of Longview, Tex.

[73] Assignee: Eastman Chemical Company, Kingsport, Tenn.

[21] Appl. No.: 09/128,804

[22] Filed: Aug. 4, 1998

[51] Int. Cl.[7] .................................................... C08F 2/04
[52] U.S. Cl. ............................. 526/68; 526/70; 526/348
[58] Field of Search ................................. 526/68, 70, 348

[56] References Cited

U.S. PATENT DOCUMENTS

| | | | |
|---|---|---|---|
| 3,770,709 | 11/1973 | Tegge et al. | 526/68 |
| 3,931,135 | 1/1976 | Asada et al. | 260/93.7 |
| 4,228,263 | 10/1980 | Howard, Jr. et al. | 526/154 |
| 4,442,271 | 4/1984 | Rau et al. | 526/61 |
| 4,861,845 | 8/1989 | Slocum et al. | 526/68 |
| 5,328,666 | 7/1994 | Amano et al. | 422/138 |
| 5,432,243 | 7/1995 | Bodart | 526/68 |
| 5,521,263 | 5/1996 | Seeger et al. | 526/68 |
| 5,744,555 | 4/1998 | Ames et al. | 526/67 |

FOREIGN PATENT DOCUMENTS 0204481  11/1983  Germany .
WO 92/15621  9/1972  WIPO .

*Primary Examiner*—David W. Wu
*Assistant Examiner*—Ling-Siu Choi
*Attorney, Agent, or Firm*—B. J. Boshears; Jonathan D. Wood; Harry J. Gwinnell

[57] ABSTRACT

The present invention relates to a continuous high molecular weight, amorphous polymer-producing process which includes a reactor design, an unreacted monomer and solvent recycling and purification system, a catalyst deactivation and polymer stabilization system, and a polymer isolation process. The present invention relates to the discovery of a continuous process for the production of polymers. The discovery relates particularly to Ziegler-Natta synthesis of amorphous polymers from $\alpha$-olefins. In the inventive method, it was discovered that reconfiguration of process streams for the purposes of the product stabilization and catalyst deactivation led to elimination of the need for an elaborate absorption bed train to purify recycled components. Additionally, reconfiguration of process streams resulted in an improvement of process yield where recycled solvent and unreacted monomer previously caused process yield to be marginal in comparison to using entirely new feedstocks. The present invention also comprises a preferred embodiment of the synthesis of polyoctene, the separation of polyoctene from unreacted octene monomer and unreactive hydrocarbon solvent, and the deactivation of polymerization catalyst.

25 Claims, 4 Drawing Sheets

PROCESS FOR THE SYNTHESIS OF HIGH MOLECULAR WEIGHT PREDOMINANTLY AMORPHOUS POLYMERS WITH IMPROVED COLOR AND ADHESIVE PROPERTIES

BACKGROUND OF THE INVENTION

1. The Field of the Invention

The present invention relates to the formation of polymers. More particularly, the present invention relates to the synthesis of amorphous polymers formed from α-olefins that have color and adhesive qualities that are improved over the prior art. In particular, the present invention relates to a continuous, economical amorphous polyolefin synthesis process which includes a reactor design, an olefin monomer and hydrocarbon solvent recycling and purification system, a catalyst deactivation and polymer stabilization system, and a polymer isolation process.

2. The Prior State of the Art

Predominantly amorphous polyolefin solutions can be produced in a solution process using a loop reactor. In a loop reactor, the polyolefin and reactants are continually circulated. The amorphous polyolefins formed are dissolved in unreacted liquid monomer and/or hydrocarbon solvent.

A process was developed to produce dissolved polyoctene in an unreactive mineral spirits solvent. During the catalyst deactivation process, catalyst poisons were being introduced to the system and other catalyst poisons being produced. The process of catalyst deactivation resulted in substantial loss of solvent and unreacted monomer due to poisoning thereof by the effects of the catalyst deactivation compounds. The unreacted monomer and solvent needed to be cleaned of the poisons before they could be recycled.

Attempts were made to reclaim the solvent. These attempts included fractional distillation of the recycled solvent and unreacted monomer through a 25-plate distillation column, followed by circulating the center-cut solvent for 16 hours through an absorption bed train as illustrated in FIG. 1. The result, however, was only poor catalyst productivity of about 30% of a control process. The control process was established by running the polymerization process under the same conditions with the exception that all feedstocks were provided as fresh off-the-shelf commodities. Under the control conditions, catalyst productivity was established at a nominal 100%. Additionally, the degree of conversion of monomer with the control conditions was in excess of 70%.

Another prior art process for recovering product and deactivating the catalyst entailed introduction of chemicals such as antioxidant, acid scavenger, and catalyst deactivator into a product surge tank and mixing by use of a circulating pump. The product stream after such treatment was then introduced into a screw extruder and the majority of the volatile materials were removed by low-pressure fractionation after catalyst deactivation. The light-key components removed thereby were then distilled and passed through an absorption bed train such as that depicted in FIG. 1. As in the above-mentioned prior art process, use of the distillation column and the absorption bed train was considered expedient because recovery of both unreacted monomer and the solvent were necessary for environmental and economic reasons. Once again, use of recycled monomer and solvent, even after substantial purification through distillation and in the absorption bed train resulted in inferior catalyst productivity, also about 30%, in comparison to the control.

Other difficult tasks included catalyst deactivation in a predominantly polymer mass and isolating polymer such as polyoctene from a 20–40% dissolved polymer solids in a mineral spirits solution. Thus, there existed challenges for developing an economical continuous amorphous polymer synthesis process. These challenges included the redesigning of the reactor, a method for purification of recycled monomer and solvent, a method for catalyst deactivation, and a method for isolation of the amorphous polymer. No commercial processes existed previously for the production of amorphous polyhexene or for amorphous polyoctene having high molecular weight (an inherent viscosity (IV) from about 3 1.0 IV to about 5.0 IV), good color, and good adhesive properties.

Therefore, what is needed in the art is an improved method of producing high molecular weight amorphous polymers. Such features and advantages are disclosed and claimed herein.

SUMMARY OF THE INVENTION

The present invention produces high molecular weight, amorphous polymers in a solution process that avoids poisoning of unreacted monomer and solvent. The invention includes a reactor design, an unreacted monomer and solvent purification and recycling system, a polymer stabilization and catalyst deactivation system, and a polymer isolation process.

The present invention uses a Ziegler-Natta synthesis of an amorphous polymer from α-olefins. In the inventive method, the need for solvent distillation and purification by use of a distillation column and an absorption bed train was eliminated. The present invention also efficiently deactivates catalyst in a predominantly polymer mass. Additionally, the inventive configuration of process streams resulted in an improvement of catalyst productivity where recycled solvent and monomer previously caused catalyst productivity to be marginal in comparison to using entirely new feedstocks.

The present invention, in a specific application, produces at least one amorphous polymer that includes contacting at least one α-olefin monomer dissolved in 0–99% of an unreactive hydrocarbon solvent and in the presence of a catalyst in a recirculated, stirred reactor for a time sufficient to produce the polymer thereof. Separation of unreacted monomer and solvent is carried out before deactivation of the catalyst from within the polymer produced from the monomer. Thereby, it is found that unreacted monomer and unreactive hydrocarbon solvent are essentially free of catalyst poisons and can be recycled to the reactor without the need to pass them through purification steps such as a distillation column and an absorption bed train.

The present invention is thus contemplated for any polymerization system where the polymer is substantially dissolved, wherein catalyst deactivation is postponed until substantial removal of unreacted monomer and unreactive solvent which are recycled into the reactor free of catalyst-poisoning substances. In particular, the present invention is useful for Ziegler-Natta polymerization of α-olefins selected at least from $C_3$–$C_{10}$ olefins and combinations thereof.

The present invention also includes a method of stripping a dissolved polymer stream of unreacted monomer and organic solvent. The present invention also includes a method of effectively deactivating a catalyst for use in the synthesis of at least one polymer. The present invention also comprises a system for catalyst deactivation and polymer stabilization. The present invention particularly comprises a reactor system for the synthesis of elastomeric polypropylene and/or polyoctene and/or polyhexene.

The present invention also comprises preferred embodiments of the synthesis of predominantly amorphous polyhexene and/or polyoctene, the separation of polyhexene and/or polyoctene from unreacted hexene and/or octene monomer and unreactive hydrocarbon solvent, and the deactivation of the polymerization catalyst.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be understood, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which:

FIG. 3 illustrates the inventive method of stripping unreacted monomer and solvent from the polymer product in a single-pass unit operation by use of a twin-screw extruder.

DETAILED DESCRIPTION OF THE PREFERRED EMBODIMENTS

The present invention relates to a process for production of high molecular weight, amorphous polymers in a solution process that avoids the poisoning of unreacted monomer and solvent that occurred in the prior art. The invention includes a reactor design, an unreacted monomer and solvent purification and recycling system, a polymer stabilization and catalyst deactivation system, and a polymer isolation process.

The present invention relates more particularly to a Ziegler-Natta synthesis of an amorphous polymer from α-olefins that avoids the poisoning and marginally effective purification problems in the prior art. In the inventive method, the need for solvent purification by use of a distillation column and an absorption bed train was eliminated. The present invention also efficiently deactivates catalyst in a predominantly polymer mass. Additionally, the inventive configuration of process streams resulted in an improvement of catalyst productivity where recycled solvent and unreacted monomer previously caused catalyst productivity to be marginal in comparison to using entirely new feedstocks.

1. Process Overview

Figure 2:
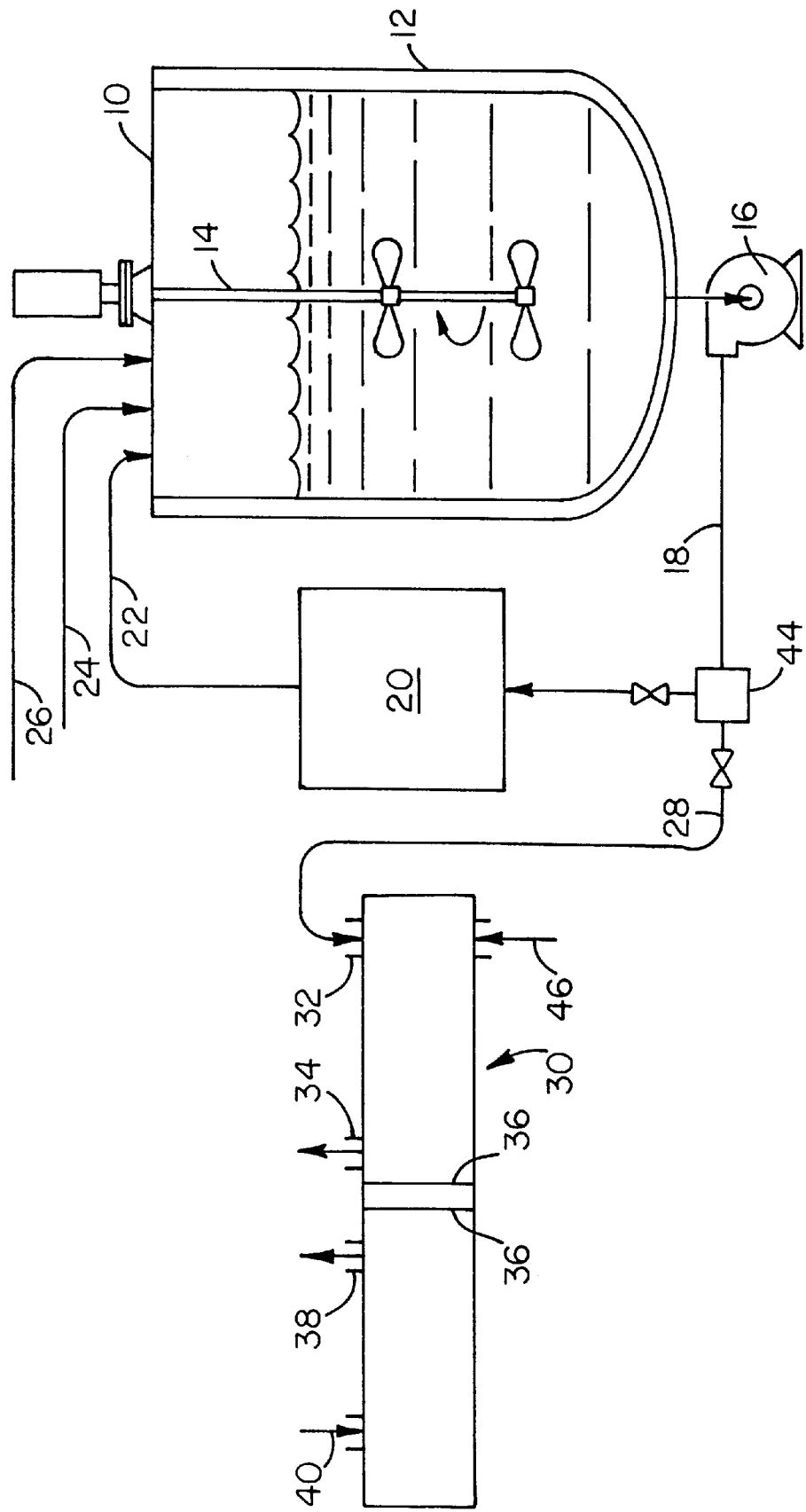
FIG. 2 is a schematic of the inventive process including the inventive reactor design and the inventive system used for the polymerization of α-olefins such as polyhexene and/or polyoctene.

In a general embodiment, the present invention is illustrated in FIG. 2. In FIG. 2 it can be seen that a reactor 10 is provided with a heat exchanger 12. FIG. 2 depicts heat exchanger 12 as a jacketed reactor heat exchanger. It is understood that heat exchanger 12 may be any suitable device for controlling temperature conditions within reactor 10 such as a jacket, internal coils, and the like.

Reactor 10 may be agitated by an impeller 14. The specific configuration and pitch of impeller 14 may depend upon the application. A recirculation pump 16 may be found outside reactor 10, whereby a reactor effluent stream 18 is used to remove and circulate the reactor contents. A stream splitter 44 is controlled in response to feed and recycle streams that enter reactor 10. Preferably, stream splitter 44 sends the majority of material in reactor effluent stream 18 through an optional external heat exchanger 20 and through a reactor recycle stream 22 that returns polymer, unreacted monomer, solvent, and catalyst to reactor 10. Reactor 10 is supplied, in addition to reactor recycle stream 22, with a catalyst feed stream 24 and a feedstocks stream 26.

At stream splitter 44, a product slip stream 28 is generated and fed to a product fractionator 30. It is preferable to control temperature within product fractionator 30 so as to not substantially degrade the synthesized polymer. Product fractionator 30, a reactant/solvent/product fractionation means may be, by way of non-limiting example, a twin screw extruder (TSE). Product fractionator 30 may also be, by way of non-limiting example, a series of at least two optionally agitated flash vessels such as flash-adapted continuous stirred tank reactors (CSTR). Product slip stream 28 is advanced between and beyond the flash vessels by at least one positive-displacement pump such as a Moyno®, a Geho®, a Milton Roy®, and the like. Product fractionator 30 may also be, by way of no-limiting example, at least one wiped film evaporator (WFE). By reading the disclosure of the present invention and/or by practicing the invention, one of ordinary skill in the art will appreciate that other stripping techniques could be applied for removing unreacted monomer and solvent.

An acid scavenger and an antioxidant are added to product slip stream 28, either before it enters product fractionator 30 or simultaneously therewith. A preferred acid scavenger is calcium stearate for use in α-olefins. A preferred antioxidant is Irganox® 1010.

Product fractionator 30 has a fractionator feed stream port 32 and at least one removal port for removing a light-key group. A first light-key group removal port 34 provides a volatile product-removing capability and is found downstream from fractionator feed stream port 32. Thereafter, a physical barrier 36 such as at least one blister in a TSE, acts to prevent the vaporizing first light-key group from passing downstream instead of exiting through light-key group removal port 34.

After polymer product is forced through physical barrier 36, an optional second light-key group removal port 38 is provided. It is understood that a series of physical barriers and light-key group removal ports may be found in product fractionator 30. The number of removal ports and physical barriers will depend upon the relative volatilities of the light-key group among themselves and in relation to the heavy-key group according to process goals.

Downstream from physical barrier 36, second light-key group removal port 38 may be located. Additionally, a catalyst deactivation reagent stream 40 is located downstream from physical barrier 36. Catalyst deactivation reagent stream 40 may optionally be placed downstream from product fractionator 30 such as somewhere in the finished product stream 42. Finally, finished product stream 42 exits product fractionator. The finished polymer may have a viscosity, measured at 190° C. from about 500,000 cP to about 2,500,000 cP.

a. General Process Example

Reactor 10 is charged with at least one α-olefin, solvent, and purified recycle streams thereof. The purified recycle streams are purified according to the inventive method. Additionally, catalyst feed stream 24 supplies a Ziegler-Natta catalyst system such as a titanium halide catalyst and a cocatalyst selected from di- and tri-alkylaluminum halides such as that taught in U.S. Pat. No. 5,521,263, the entire disclosure of which is incorporated herein by specific reference. The last feed to reactor 10 comprises reactor recycle stream 22. Within reactor recycle stream 22 there exists a dissolved amorphous polymer, unreacted α-olefin monomer of the polymer, about 0 to 99 weight percent of an unreactive hydrocarbon solvent, and a catalyst. The viscosity of recycle stream 22 is in a range from about 100 to 500,000 cP, preferably from about 250 to about 400,000 cP, and more preferably from about 500 to about 100,000 cP. The temperature is in a range from about 20° C. to about the boiling point of the α-olefin (s) either singly or as a multiple α-olefin combination.

According to the inventive method, a mixture is defined as comprising dissolved amorphous polymer. The mixture may also include monomer. The mixture may also include monomer and solvent. The mixture may also include monomer and suspended catalyst. The mixture may also include solvent and suspended catalyst. The mixture may also include monomer, solvent, and suspended catalyst. The mixture is recirculated in reactor 10 for a time sufficient to produce dissolved amorphous polymer by use of the Ziegler-Natta type catalyst. The predominantly amorphous polymer mixture is also defined as including a fraction of crystalline polymer, e.g syndiotactic polymer and/or isotactic polymer, in an amount less than about 50%, preferably less than about 10%, more preferably less than about 1%, even more preferably from about 1% to about 0.1%, and most preferably less than about 0.1%.

After preferably achieving a steady state, stream splitter 44 is configured to allow product slip stream 28 to supply product fractionator 30. It is preferable to monitor and control temperature within product fractionator 30 so as to avoid product degradation caused by high temperatures.

A product treatment stream 46 is placed somewhere downstream from stream splitter 44 to stabilize the synthesized polymer and to kill the catalyst. For example, when an α-olefin is being used in the syntheses of its polymer, an antioxidant and an acid scavenger are added at product treatment stream 46.

Product slip stream 28 may comprise a solution, a pressurized vapor, or a combination thereof depending upon the particular α-olefin(s) used. Once product slip stream 28 enters product fractionator 30, a first light-key group is removed through first light-key group removal port 34. Where product fractionator 30 is a TSE, at least some unreacted monomer and some solvent comprise the first light key group and are removed through first light-key group removal port 34 by reducing pressure such as by pulling a vacuum therethrough. Where product fractionator 30 is at least two optionally agitated flash vessels and a corresponding number of positive displacement pumps, unreacted monomer and solvent are removed through a flash port that would be first light-key group removal port 34 by reducing pressure such as by pulling a vacuum therethrough.

Where product fractionator 30 is at least one WFF, unreacted monomer and solvent are removed by spreading the mixture into a large surface area and then by reducing ambient pressure such as by pulling a vacuum and by optionally increasing temperature. Product slip stream 28 is thus fractionated, for example, by vacuum distillation or by temperature-assisted evaporation or both. At this point, predominantly amorphous polymer begins to precipitate due to solvent and/or monomer removal. Thus, light key components that are solvent and unreacted monomer are fractionated out of the product stream and there remain in the product stream heavier key components such as aqueous components and the precipitating amorphous polymer.

After the product stream has been stripped of a major fraction of unreacted monomer and solvent, it is next forced through physical barrier 36. Where physical barrier 36 is part of a TSE, at least one blister is provided. Preferably, at least two blisters are provided. Physical barrier 36 thus prevents the escape of vaporizing monomer and solvent in the downstream direction, and it simultaneously prevents upstream contamination of catalyst poisons into the first light-key group stream as it exits through first light-key group removal port 34. Additional removal ports and physical barriers may be configured within product fractionator 30 as discussed above.

Figure 3:
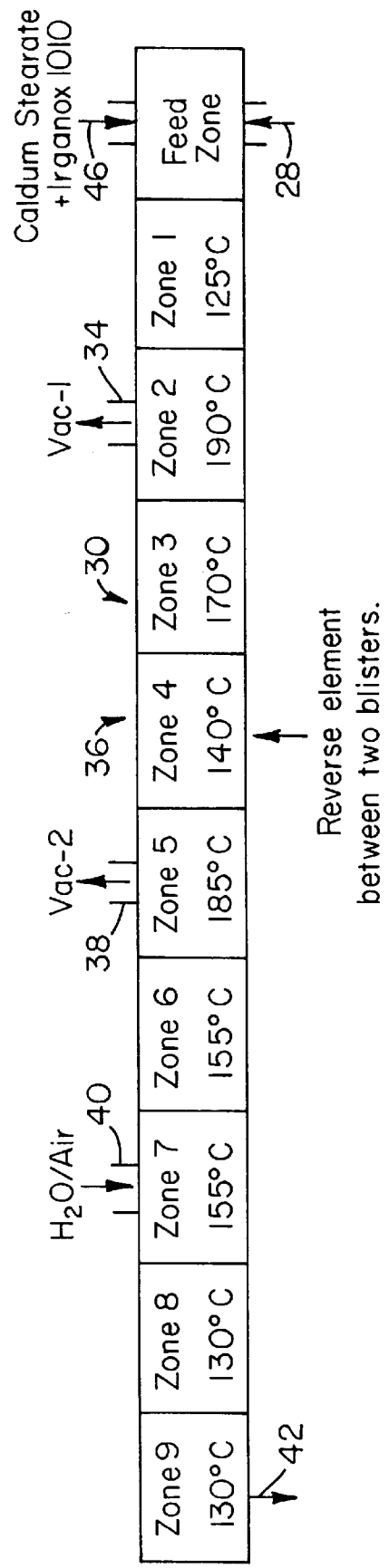
FIG. 3 is a schematic representation of the inventive method comprising the isolation of polymer product in a separator and the deactivation of reaction catalyst according to one inventive configuration that avoids poisoning of unreacted monomer and solvent. Additionally.

Physical barrier 36 may include a configuration of a reverse element in a TSE between two blisters as illustrated in FIG. 3. Downstream from physical barrier 36, a second light-key group removal port 38 may be located. Within the same physical confines of second light-key group removal port 38, catalyst deactivation reagent stream 40 may be provided.

A TSE is one preferred device for use in the inventive process because the viscosity of the product stream increases substantially upon the removal of unreacted monomer and the solvent. A WFE is also preferred for use in the inventive process for some scales of production because of the extremely large surface area that may be created out of a mixture. Additionally, a WFE may be used upstream and the polymer product may be finished by use of a TSE.

Catalyst deactivation reagents are $H_2O$ and air for use in the synthesis of polyoctene, by way of non-limiting example. A catalyst deactivation reagent by definition is a catalyst poison. Upon addition of catalyst deactivation reagents, other catalysts poisons are immediately produced. The other catalyst poisons that may be generated upon the addition of $H_2O$ and water are poisons such as hydrochloric acid (HCl) and chlorinated hydrocarbons. The presence of physical barrier 36 thus prevents upstream contamination of catalyst poisons introduced and produced by catalyst deactivation regent stream 40 as they are undesirable in the first light-key group stream or any subsequent light-key group stream except for that found exiting second light-key group removal port 38.

Finally, finished product stream 42 exits product fractionator 30. According to the inventive method, finished product stream 42 comprises at least one synthesized polymer that has been substantially stripped of unreacted monomer and solvent. Additionally, deactivated catalyst, usually in oxidized form, is in finished product stream 42 in trace amounts.

The following four examples, b–e, illustrate amorphous polymer production according to the inventive method from vaporous monomers, liquid monomers, and combinations thereof.

b. Synthesis of Elastomeric Polypropylene

In a first specific example, the synthesis of elastomeric polypropylene is carried out according to the inventive method. Although propylene monomer is a vapor at ambient conditions, and thus more easily separable from catalyst poisons due to its vaporous nature, the inventive method is advantageous for the flash vaporization of propylene monomer and solvent prior to their exposure to catalyst poisons.

According to the inventive method, a catalyst tank is charged with one liter of a catalyst slurry consisting of 12.0 gram partially dehydrated fumed $Al_2O_3$ from DuPont having a hydroxyl count of 0.3 to 0.9 mmole OH/gram $Al_2O_3$ and 1.5 gram tetraneophyl zirconium (TNZ) (weight ratio of $Al_2O_3$:TNZ=8:1) per liter of dry mineral spirits, 7.0 liter of dry mineral spirits; and 2.0 liter of 5.0 percent elastomeric polypropylene (ELPP) slurry.

The reactor design may consist of a stirred autoclave reactor 10 equipped with a spring-loaded impeller 14 and a recirculation system equipped with an LCI gear pump 16. This system allows the continuous production of an ELPP slurry at a high solids content of about 20% in mineral spirits and dissolved propylene. Reactor effluent is let down by a 2-3 stage venting and solvent exchange system (not pictured). In this arrangement, the polymer/monomer/solvent/catalyst mixture is discharged with addition of mineral spirits into a first let down tank (450–125 psi, not pictured) and into a second let down tank (125–20 psi, not pictured).

In particular, the ELPP mixture is prepared by taking a slip stream from the second let down tank and diluting it with dry mineral spirits from about 20 to about 5 percent solids. This catalyst-laden mixture consisting now of 1.5 gram. TNZ and 12 gram of $Al_2O_3$ in 10.0 liter of about 10 wt % ELPP mixture in mineral spirits is continuously recycled to the 10 gallon stirred autoclave reactor 10 at 5 liter/hour (8.26 pound mineral spirits/hour; 0.0132 pound $Al_2O_3$/hour; 0.00165 pound TNZ/hour; and 0.083 pound ELPP/hour). Also fed to stirred autoclave reactor 10 are high purity $C_3H_6$ at 4.13 pound/hour and high purity $H_2$ at 0.25 SCFH (0.00117 pound/hour). The reaction conditions include a temperature of about 65±2° C., a jacket temperature of about 40° C., and a pressure of about 450 psi. Reactants are charged to reactor 10 with an $H_2/C_3H_6$ ratio of about 0.00028 with the hydrocarbon mineral spirits being about 66.6% of the feed and propylene being about 33.3%. Under these conditions, a 2.4 liter/hour flow rate ELPP mixture is produced as a 20.6 percent dissolved solids at 10.34 pound/hour. This amounts to an ELPP production rate of about 2 pound/hour and a catalyst yield of about 1300 pound ELPP/pound TNZ.

The reactor discharge is degassed in the letdown tank system by reducing the pressure from about 450 to about 20 psi. At stream splitter 44, product slip stream 28 is diverted to a 25 mm TSE product fractionator 30 and is stabilized by adding 0.25 percent Irganox 1010 based on solid ELPP into the 25 mm TSE. The TSE product fractionator 30 receives the product stream at fractionator feed stream port 32 and the product is isolated by stripping out the solvent and unreacted propylene through first light-key group removal port 34. Thereafter the product stream, comprising mostly polymer and aqueous components, passes through physical barrier 36 and a second product fractionation is carried out in connection with catalyst deactivation. $N_2$ is supplied in catalyst deactivation stream 40 and is purged through the product stream downstream from physical barrier 36, at a rate of 5 SCFH.

Figure 1:
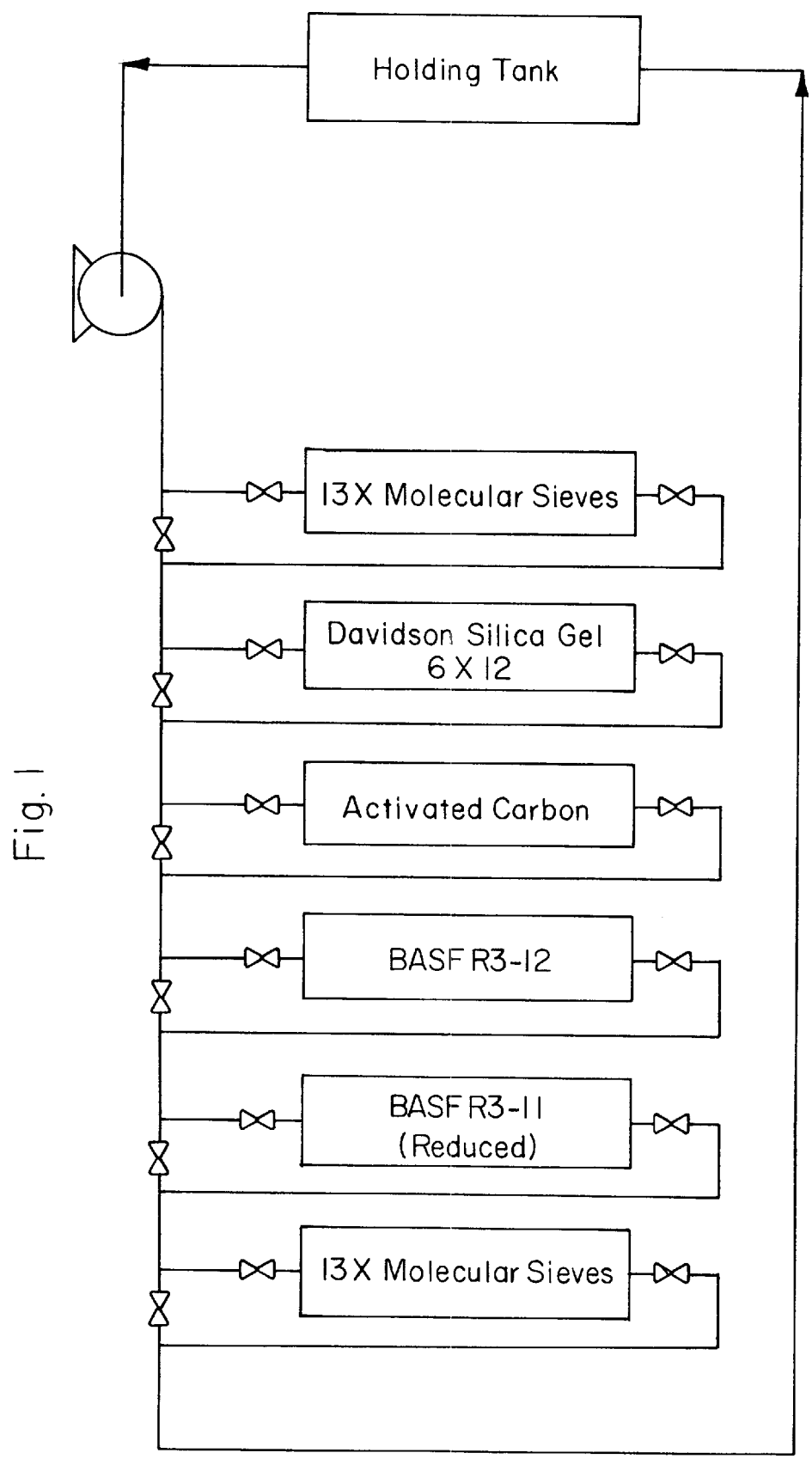
FIG. 1 is a schematic illustration of an absorption bed train previously required in the prior art to purify unreacted monomer and recycle solvent after the addition of make-up solvent and prior to the recycle thereof to the reactor.

By the delay of catalyst deactivation until after a substantial removal of unreacted propylene monomer and solvent, a substantially catalyst poison-free unreacted monomer and solvent are recovered and can be recycled to feedstock stream 26 without the need to purify solvent through distillation and an absorption bed train such as that depicted in FIG. 1.

c. Synthesis of Amorphous Polyoctene

In a second specific example, the production of high molecular weight amorphous polyoctene was successfully carried out in a continuous 10-gallon stirred pilot plant reactor 10 equipped with an LCI gear pump 16 and external heat exchanger 20 as illustrated in FIG. 2.

A catalyst slurry was made up in the catalyst tank at a concentration of 2.67 grams solid fourth generation catalyst having an $Al(Et)_3$:Ti mole ratio of 15:1 with or without an $Al(Et)_3$:cyclohexylmethyldimethoxysilane (CHMDS) mole ratio of 10–20:1 per liter of dry mineral spirits. This catalyst slurry was then circulated through the c atalyst tank (not pictured) to keep the solid catalyst particles in suspension. Continuous circulation insured that adequate amounts of catalyst could be fed continuously to the reactor.

Catalyst, octene monomer, and mineral spirits as the unreactive hydrocarbon solvent were fed to reactor 10 where the polymerization of octene took place at 60–75° C. and 350 psi. The resulting polymer/monomer/solvent/catalyst mixture was controlled at 33+2% dissolved polyoctene solids, circulated through reactor 10 and external heat exchanger 20, and continuously discharged at stream splitter 44 and pumped to a hold-up or surge tank (not pictured.) The hold-up tank may be located between stream splitter 44 and product fractionator 30. In the hold-up tank, Irganox 1010 (0.25% based on solid polymer) and calcium stearate (700 ppm based on solid polymer) was added to kill the catalyst and to stabilize the polymer. This was accomplished by adding 500 ml of a hot solution (70–80° C.) of 4.7 gram calcium stearate and 16.7 gram Irganox 1010 in 1000 ml of mineral spirits, assuming a production rate of 22.29 pound polymer solution/hour at 33% solids (7.36 lb polyoctene/hour).

The 25 mm TSE, depicted schematically in FIG. 3 as product fractionator 30, was fed from the hold-up tank. The inventive method led to TSE set up and screw design. This allowed for the successful removal and recycle of unreacted monomer and solvent catalyst, deactivation of the catalyst, and isolation of the polymer. These process goals we achieved all in one pass through product fractionator 30 as illustrated in FIG. 3. A preferred configuration and operating conditions of TSE product fractionator 30 for polyoctene are also illustrated in FIG. 3.

About 95% of the light-key group in the mixture, containing unreacted monomer and mineral spirits, was removed by vacuum stripping at first light-key group removal port 34. Thereafter the heavy key group, comprising about a 95% solids precipitated polymer, was catalyst deactivated in product fractionator 30, downstream from physical barrier 36 by addition of aerated water at a rate of 0.4 cc/minute.

Finally the remaining faction of the light key group was removed by vacuum stripping at second light-key group removal port 38. The remaining fraction included monomer, solvent, mostly mineral spirits, and the catalyst deactivation reagents and products such as $H_2O$, $O_2$, HCl, and organic chlorides.

It was surprising to find that the very viscous approximately 95% solids polyoctene stream could be successfully catalyst deactivated with aerated $H_2O$ in the TSE, because intimate contact of the active catalyst particles and the catalyst deactivation ingredients ($H_2O$ and $O_2$) is needed. Under the temperature conditions within the TSE, the aerated $H_2O$ substantially vaporized and caused significantly greater oxidant contact of the catalyst than if catalyst deactivation had been carried out at ambient conditions.

The final polyoctene product was analyzed for IV in toluene at 25° C. The products were analyzed for residual metals by inductive coupled plasma (ICP) and for Irganox 1010 by ultraviolet illumination after extraction with a 50/50 methylene chloride/isopropanol solvent mixture while the recycle solvent was analyzed for unreacted octene by gas chromatography and for inorganic (HCl) and organic chlorides by oxidative microcoulometry (Mistubishi TEX-10E).

According to the present invention, catalyst productivity is greater than 35% with respect to the control with recycled 1-octene and solvent, taken from first light-key group removal port 34, without optional further treatment. This catalyst productivity of greater than 35% is compared to the control process wherein all feedstocks are supplied from fresh off-the-shelf sources. Preferably, the catalyst productivity with recycle is greater than 50% when compared to the control process. More preferably, the catalyst productivity with recycle is greater than about 90% when compared to the control process. Most preferably, the present invention results in a catalyst productivity of greater than or equal to about 95% with recycle when compared to the control process.

d. Synthesis of a Polypropylene/Polyoctene Compound

Figure 4:
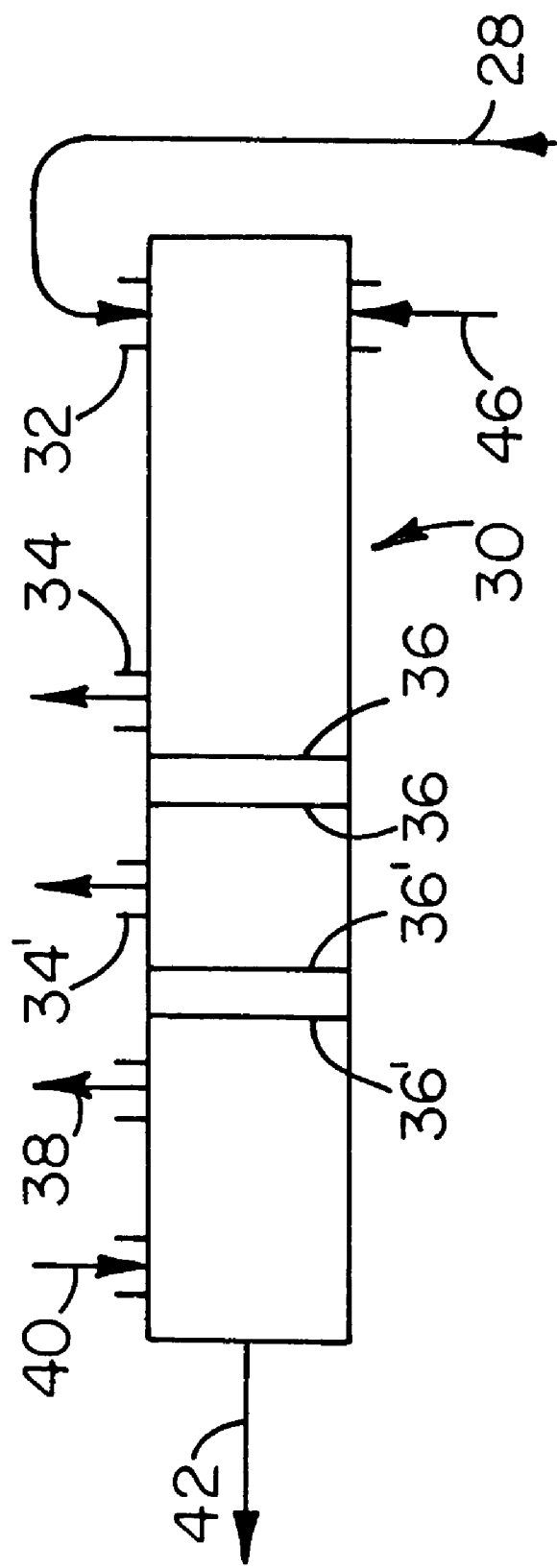
FIG. 4 is a schematic of an alternative embodiment of a separator as part of the inventive system.

In a third specific example illustrated in part in FIG. 4, polypropylene and polyoctene are simultaneously produced to make an elastomeric adhesive compound. Product fractionator 30, if a TSE, may have an optional series of at least two of light-key group removal ports 34, 34', separated each by at least one blister acting as physical barrier 36. In the upstream occurrence of first light-key group removal port 34, a major fraction of unreacted propylene separates from the mixture by vaporizing under ambient conditions or by reducing pressure. The downstream occurrence of second light-key group removal port 34' is operated under reduced pressure such as by pulling a vacuum. Thereby, a major fraction of unreacted 1-octene and solvent separates from the mixture by vaporizing. Catalysts are deactivated using wet $N_2$ and air downstream from third light key group removal port 38. By the inventive method, solvent, propylene, and octene are isolated from catalyst deactivation reagents to prevent their poisoning.

e. Synthesis of a Polyhexene/Polyoctene Compound

In a fourth specific example illustrated in part in FIG. 4, polyhexene and polyoctene are simultaneously produced to make an adhesive compound. Product fractionator 30, if a TSE, may have an optional series of at least two of light-key group removal ports 34, 34', separated each by at least one blister acting as physical barrier 36. In the upstream occurrence of first light-key group removal port 34, a major fraction of unreacted hexene separates from the mixture by reducing pressure. The downstream occurrence of second light-key group removal port 34' is also operated under reduced pressure such as by pulling a vacuum. Thereby, a major fraction of unreacted 1-octene and solvent separates from the mixture by vaporizing. Catalysts are deactivated using wet air downstream from third light key group removal port 38. By the inventive method, solvent, hexene, and octene are isolated from catalyst deactivation reagents to present their poisoning.

Multiple α-olefin monomers may be separated under this scheme by taking advantage of disparate vapor pressures. Preferably, a first vapor pressure will be greater by about 1.5 than a second vapor pressure, and preferably at least about twice that of a second vapor pressure.

The following examples are set forth to illustrate variations on the synthesis of polyoctene. It is understood, however, that these polyoctene examples are not to be limiting of the scope of the invention.

2. Polyoctene Synthesis a. EXAMPLE 1

A 10 gallon stirred pilot plant reactor 10 equipped with an LCI gear pump 16 and external heat exchanger 20 as seen in FIG. 2 was continuously charged with a catalyst slurry consisting of 8.0 gram of solid catalyst as described in U.S. Pat. No. 5,521,263, the disclosure of which is incorporated herein by specific reference. The solid catalyst had an $Al(Et)_3$:Ti mole ratio of 15:1 and an $Al(Et)_3$:CHMDS mole ratio of 20:1. The catalyst slurry included 3.0 liter of dry purified mineral spirits at 0.11 gal/hr or 418 ml/hr (0.69 pound mineral spirits and 1.115 gram solid catalyst/hr or 0.00246 pound solid catalyst/hr). Also fed continuously to the reactor were 1.8 gal/hr (10.63 pound/hr) of dry purified mineral spirits and 1.8 gal/hr (10.97 pound/hr) of dry, purified 1-octene.

The polymerization of octene was carried out at 70±2° C. and 350 psi pressure while the polymer/monomer/solvent mixture containing 33±2% dissolved predominantly amorphous polyoctene solids was circulated through reactor 10 and external heat exchanger 20 at 3.0 to 5.0 gal/min, continuously discharged at stream splitter 44, and pumped to a hold-up tank (not pictured). To the reactor discharge was added Irganox 1010 (0.25% based on solid polymer) and calcium stearate (700 ppm based on a solid polymer) to kill the catalyst and to stabilize the polymer. This was accomplished by adding 500 ml/hr of a hot (70–80 C) solution of 4.7 grams calcium stearate and 16.7 grams Irganox 1010 in 1000 ml of mineral spirits. A production rate of 22.3 pound polymer solution/hr at 33% dissolved polymer solids (7.36 pound polyoctene/hr) was obtained.

Product fractionator 30, in this example the TSE depicted in FIG. 3, was fed from the hold-up tank. The inventive TSE set up and screw design allowed for removal and the recycle of unreacted monomer and solvent. Additionally, the TSE scheme allowed catalyst deactivation of the polymer and isolation of the polymer all in one pass through the TSE. Design of the TSE configuration includes the approximate screw element profiles in mm and approximate element lengths, also in mm. The table sets forth by way of non-limiting example, the TSE element design used in the processing of polyoctene.

TABLE

TSE Configuration

| Screw profile, mm | Element length, mm | Screw profile cont., mm | Element length cont., mm |
|---|---|---|---|
| 37.5 | 37.5 | 37.5 | 37.5 |
| 37.5 | 37.5 | 37.5 | 37.5 |
| 37.5 | 37.5 | Spacer | 2.5 |
| 37.5 | 37.5 | zb5** | 37.5 |
| 25 | 25 | zb2 | 15 |
| kb22.5* | 37.5 | Spacer | 2.5 |
| kb22.5 | 37.5 | 25 | 25 |
| 37.5 | 37.5 | 25 | 25 |
| 37.5 | 37.5 | 25 | 25 |
| 25 | 25 | 25 | 25 |
| 25 | 25 | 25 | 25 |
| 25 | 25 | 25 | 25 |
| 25 | 25 | 25 | 25 |
| 25 | 25 | 25 | 25 |

TABLE-continued

TSE Configuration

| Screw profile, mm | Element length, mm | Screw profile cont., mm | Element length cont., mm |
|---|---|---|---|
| 25 | 25 | 25 | 25 |
| 25 | 25 | 25 | 25 |
| 25 | 25 | 25 | 25 |
| 25 | 25 | 25 | 25 |
| 25 | 25 | 25 | 25 |
| 25 | 25 | 25 | 25 |
| Blister | 7.5 | | |
| Reverse | 12.5 | | |
| Blister | 7.5 | | |

*kneading block
**Zahn block

The TSE had a total length of about 1122.5 mm with a zone length of about 125 mm each. The TSE was fed with about a 33% dissolved polyoctene solids mixture at about 10 pound/hr. In first light-key group removal port 34, in this example a first vacuum port, about 95% of the volatile materials were removed. The removed volatile materials contained about 15–20% unreacted octene, about 80–85% mineral spirits and small amounts of organic chlorides, typically about 1.5–2.5 ppm. This light-key group was optionally circulated through an absorption bed train such as that as shown in FIG. 1 for 4–8 hours and then returned to the reactor. No significant decrease in catalyst productivity was observed by use of this recycle scheme or by the optional absorption bed train recycle scheme.

Aerated $H_2O$ was added at 24 ml/hr (0.4 ml/min) to catalyst deactivate the polyoctene and the rest of the volatile material, about 5% of the total. The monomer and solvent poisons of $O_2$, $H_2O$, HCl, and chlorinated hydrocarbons were removed from second light-key group removal port 38, in this example a second vacuum port. The organic layer from the second vacuum port consisted of about 0.3 to 2.0% octene and about 97.5 to 99.7% mineral spirits containing about 5–10 ppm organic chloride. The water layer recovered from the second vacuum port contained about 250 ppm HCl. If amounts in each of the two layers had been in the first light-key group stream, they would have made it contaminated. Both layers were discarded.

The final extruded polyoctene was greater than 99.5%, solids, had an IV of 2.68, and exhibited a very good color of water white. The metal analysis revealed that the extruded polyoctene contained on an average 373 ppm ash, 10 ppm Ti, 74 ppm Al, 62 ppm Mg, 81 ppm Ca, and 185 ppm Cl. Based on the above data, polyoctene was produced at a catalyst productivity of about 2992 pound polymer/per pound solid catalyst and at a conversion of about 65%. Catalyst productivity was about 94% of the control. Practically no break in the polymer IV was observed in the extrusion step.

b. EXAMPLE 2

Essentially the same procedure was followed as described in Example 1. The same catalyst was used but a modification thereof was made where an $Al(Et)_3$:Ti mole ratio of 15:1 was used. Additionally, the polymerization was carried out at 60±2° C. and about 350 psi pressure. Under these conditions, 22.3 pound/hour of polymer/monomer/solvent/catalyst mixture of about 35% dissolved polyoctene solids was produced (7.81 pound polyoctene/hour).

The final extruded polyoctene was greater than 99.5% solids. It had an IV of about 2.57, and exhibited a very good color of water white. The metal analysis revealed that it contained on an average 325 ppm ash, 8 ppm Ti, 65 ppm Al, 58 ppm Mg, 75 ppm Ca, and 168 ppm Cl. Based on the above data, polyoctene was produced at a catalyst productivity of about 3,175 pound polymer per pound of solid catalyst at a conversion of about 70%. Catalyst productivity was above about 99% of the control.

c. EXAMPLE 3

Essentially the same procedure was followed as described in Example 1. The same catalyst was used but a modification was made where an $Al(Et)_3$:Ti mole ratio of 15:1 and an $Al(Et)_3$:CHMDS mole ratio of 10:1 was used. Additionally, the polymerization was carried out at 75±2° C. and about 350 psi pressure. Under these conditions about 22.3 pound/hour of polymer/monomer/solvent/catalyst mixture of about 30.5% dissolved polyoctene solids was produced (about 6.8 pound polyoctene/hour).

The final extruded polyoctene showed greater than about 99.5% solids. It had an IV of about 2.70 and exhibited a very good color of water white. The metal analysis revealed that it contained on an average 394 ppm ash, 11 ppm Ti, 78 ppm Al, 68 ppm Mg, 83 ppm Ca, and 193 ppm Cl. Based on the above data, polyoctene was produced at a catalyst productivity of about 2,764 pound polymer/per pound solid catalyst at a conversion of about 61%. Catalyst productivity was about 87% of the control.

The present invention therefore relates to a process for the solution synthesis of an amorphous polymer that includes contacting at least one monomer, preferably at least one α-olefin monomer, dissolved in an unreactive hydrocarbon solvent and in the presence of a catalyst in a recirculated, stirred reactor for a time sufficient to produce the polymer thereof. Separation of unreacted monomer and solvent is carried out before deactivation of the catalyst. Thereby, it is surprisingly found that unreacted monomer and unreactive hydrocarbon solvent can be recycled to reactor 10 without the need to pass them through a purification step such as an optional absorption bed train illustrated in FIG. 1.

The present invention is thus contemplated for any solution polymerization system wherein catalyst deactivation is postponed until substantial removal of unreacted monomer and unreactive solvent. In particular, the present invention is useful for Ziegler-Natta polymerization of α-olefins selected at least from $C_3$–$C_{10}$ olefins and combinations thereof.

The present invention is thus useful by separating unreacted monomer and unreactive hydrocarbon solvent. Separation methods include vapor fractionation, by way of non-limiting example, in a TSE such as vacuum-assisted distillation where the vapor pressure of the unreacted monomer so requires. Alternative equipment setups may include a high viscosity pump such as that made by Moyno®, Geho®, Milton Roy®, and the like. Staged operations may be carried out by causing unreacted monomer and unreactive hydrocarbon solvent to flash vaporize such as in a distillation CSTR, followed by polymer advancement by a preferred pump or by a TSE to at least one subsequent distillation CSTR.

Another equipment scheme for stripping the polymer may include a wiped film evaporator with the use of low pressure and increased temperature. For example, a viable method of volatilizing unreacted monomer and solvent comprises spreading the mixture thinly upon a first surface to create a large surface area thereof. Following thin-spreading of the mixture, light-key components are fractionated away from heavier key components due to the large surface area of the mixture in the presence of low pressure and increased temperature.

The present invention also includes a method of stripping a dissolved polymer stream of unreacted monomer and organic solvent. In this embodiment, the present invention comprises feeding a polymer solution in a mixture to a stripping apparatus or stripping unreacted monomer and other materials away from the polymer. In at least one stage, at least one fraction of solvent and unreacted monomer are removed from the mixture. Following at least one such removal stage, the remaining mixture is passed through at least one physical barrier. Catalyst deactivation follows downstream from the at least one physical barrier and substantially all remaining unreacted monomer and solvent are separated from the mixture in at least one second separation stage. Preferably, the first separation stage removes a greater fraction of unreacted monomer and solvent than any separation stage that is downstream from the physical barrier. Catalyst deactivation is preferably carried out using a liquid/gas combination. The liquid/gas combination for catalyst deactivation is preferably water with air or oxygen entrained therein. The liquid may nominally be a carrier for the gas that acts as an oxidizer. In the case of water, dissolved oxygen is also useful besides the oxygen entrained in the water. Other liquids may be suitable to carry/absorb the oxidant gas. Such other liquids include alcohols, glycols, and the like.

The present invention also includes a method of deactivating a catalyst for use in the solution synthesis of at least one polymer. A polymer solution in a mixture is fed to a stripping apparatus and a substantial fraction of unreacted monomer and solvent are separated from the mixture. The remaining mixture is passed through at least one physical barrier and the remaining mixture is contacted with a liquid/gas combination. Contacting the remaining mixture with a liquid/gas combination can be carried out immediately next to the physical barrier and upstream from a second fractionation capability, preferably substantially contiguous with a second fractionation capability, and most preferably downstream from a second fractionation capability.

The present invention also comprises a system for catalyst deactivation and polymer stabilization. In the system, a first region comprises a first volatile diluent-removing capability, a second region comprising a second volatile diluent-removing capability, and a third region comprising a liquid/gas-feed capability. The first region may be used to substantially stabilize the polymer by acid scavenging and oxidation prevention. The second region is preferably physically isolated from the first region to prevent upstream contamination of unreacted monomer and solvent. The third region is optionally within the same physical containment of the second region.

The present invention also comprises a reactor for the synthesis of polyhexene and/or polyoctene. The reactor includes a reactor vessel comprising a container means. Examples of a container means include a CSTR, autoclave CSTR, a loop reactor, a plug-flow reactor with a substantial recycle stream, and the like.

The reactor vessel also includes an agitation means. Examples of a suitable agitation means include a single- or multiple-impeller stirring shaft, and anchor-type stirrer, and the like.

The reactor vessel also includes an integral heat exchanger means. Examples of an integral heat exchanger means includes a jacketed reactor, an internal heating coil, including local heat exchange capabilities and general heat exchange capabilities, and the like.

The reactor vessel also includes a recirculation means. Examples of a recirculation means includes a high viscosity pump including an LCI gear pump, a Moyno®, a Geho®, a Milton Roy®, and the like.

The reactor vessel also includes an optional external heat exchanger means. Examples of the optional external heat exchanger means includes a shell and tube exchanger, a double pipe heat exchanger, a plate and frame heat exchanger, and the like.

The present invention also comprises a preferred embodiment of the synthesis of predominantly amorphous polyhexene and/or polyoctene, the separation of polyhexene and/or polyoctene from unreacted hexene and/or octene monomer and unreactive hydrocarbon solvent, and the deactivation of polymerization catalyst. In the preferred embodiment for the synthesis of polyhexene and/or polyoctene, a feed zone is provided for the reception of a mixture of amorphous polymer, unreacted monomer, solvent, catalyst, and treatment chemicals. Such treatment chemicals include an acid scavenger and an antioxidant. A preferred temperature range for operation in the first zone is from about 110° C. to about 140° C. A second zone is provided for volatilization of a fraction of the unreacted octene monomer and the solvent. The preferred temperature range for operation of the second zone is from about 175° C. to about 205° C. A third zone is provided and operated in a temperature range from about 165° C. to about 185° C. A fourth zone is provided comprising at least one physical barrier between the upstream active catalyst mixture and the downstream catalyst deactivated mixture. The preferred temperature range is from about 125° C. to about 155° C. A fifth zone is provided downstream from the at least one physical barrier for separating a fraction of the unreacted hexene and/or octene monomer and the solvent. The preferred temperature operating range is from about 170° C. to about 200° C. A sixth zone is provided downstream from the fifth zone and operated in a preferred temperature range from about 140° C. to about 170° C. A seventh zone is provided and configured for reception of an air-entrained water stream for deactivation of the catalyst system. The preferred temperature operating range is from about 140° C. to about 170° C. Following the seventh zone, an eighth and a ninth zone are provided and preferably operated in a temperature range from about 115° C. to about 145° C. for each zone.

The present invention may be embodied in other specific forms without departing from its spirit or essential characteristics. The described embodiments are to be considered in all respects only as illustrated and not restrictive. All changes which come within the meaning and range of equivalency of the claims are to be embraced within their scope.

What is claimed and desired to be secured by United States Letters Patent is:

1. A solution polymerization process for the synthesis of an amorphous polymer comprising:

(a) contacting at least one α-olefin monomer with a catalyst to produce said amorphous polymer in solvent, a solution thus formed comprising about 0 to about 99 weight % said solvent and having a viscosity from about 100 to about 500,000 cP at about 190° C.;

(b) separating at least one fraction of said at least one α-olefin monomer that was not reacted and at least one fraction of solvent from said solution;

(c) recycling said separated α-olefin monomer and solvent; and (d) deactivating said catalyst.

2. A process for the synthesis of an amorphous polymer according to claim 1, wherein said solvent is from about 10 to about 90 weight percent of said mixture, wherein contacting is carried out in a recirculated, stirred reactor from about 20° C. to about the boiling point of said at least one á-olefin monomer, said at least one á-olefin monomer is selected from $C_3$–$C_{10}$ olefins and combinations thereof, wherein said catalyst contains a titanium halide and a cocatalyst selected from tri-alkylaluminum and di-alkylaluminum halides, and wherein the viscosity of said solution, measured at about 190° C. is from about 100 to about 500,000 cP.

3. A process for the synthesis of an amorphous polymer according to claim 1, wherein said recycled á-olefin monomer and solvent result in a catalyst productivity of at least 35%.

4. A process for the synthesis of an amorphous polymer according to claim 1, wherein said at least one á-olefin monomer, solvent, catalyst, and amorphous polymer are being contacted within a reactor and are continually being removed and recirculated from said reactor by the use of a high-viscosity pump.

5. A process for the synthesis of an amorphous polymer according to claim 1, wherein separating comprises vapor fractionation and recycle of unreacted portions of said at least one á-olefin monomer and of said solvent.

6. A process for the synthesis of an amorphous polymer according to claim 1, wherein separating is produced by vapor fractionation of said at least one á-olefin monomer and of said solvent, said vapor fractionation being carried out isolated from and prior to deactivating said catalyst.

7. A process for the synthesis of an amorphous polymer according to claim 1, wherein said á-olefin monomer comprises at least two monomer groups comprising:

at least one first monomer in a first monomer group that includes at least one of 1-hexene and 1-octene and has a first solution vapor pressure; and at least one second monomer in a second monomer group having a second solution vapor pressure, wherein said second vapor pressure is at least about 1.5 times greater than said first vapor pressure.

8. A process for the synthesis and catalyst deactivation of an amorphous polymer according to claim 1, wherein at least one of said separated á-olefin monomer and of said solvent are passed through an absorption bed.

9. A method of stripping a dissolved amorphous polymer stream of unreacted monomer and organic solvent comprising:

feeding an amorphous polymer solution in a mixture to a stripping apparatus, said mixture containing dissolved amorphous polymer, monomer, organic solvent, and catalyst;

separating in a first stage a first fraction of organic solvent and monomer from said mixture at a first temperature and a first pressure; and passing said amorphous polymer after said separating through at least one physical barrier.

10. A method of stripping a dissolved amorphous polymer stream of unreacted monomer and organic solvent according to claim 9, following passing said amorphous polymer, further comprising:

contacting said amorphous polymer with a liquid/gas combination.

11. A method of stripping a dissolved amorphous polymer stream of unreacted monomer and organic solvent according to claim 10, wherein said liquid/gas combination comprises water with air entrained therein.

12. A method of stripping a dissolved amorphous polymer stream of unreacted monomer and organic solvent according to claim 9, further comprising:

separating in a second stage a second fraction of organic solvent and unreacted monomer from said amorphous polymer at a second temperature and a second pressure.

13. A method of stripping a dissolved amorphous polymer stream of unreacted monomer and organic solvent according to claim 12, following passing said amorphous polymer, further comprising:

contacting said amorphous polymer with a liquid/gas combination at a location for said amorphous polymer that is downstream from where separating in a second stage a second fraction of solvent and unreacted monomer is carried out.

14. A method of stripping a dissolved amorphous polymer stream of unreacted monomer and organic solvent according to claim 12, wherein said first fraction of solvent and unreacted monomer is greater than said second fraction of solvent and unreacted monomer.

15. A method of deactivating a catalyst comprising:

feeding an amorphous polymer solution in a mixture to a stripping apparatus, said mixture containing dissolved amorphous polymer, unreacted monomer, organic solvent, catalyst, and the solution and reaction products thereof;

separating a first fraction of organic solvent and unreacted monomer from said dissolved amorphous polymer at a first temperature and a first pressure to obtain a precipitating amorphous polymer;

passing said amorphous polymer after separating a first fraction, through at least one physical barrier to obtain said amorphous polymer, said amorphous polymer having an inherent viscosity from about 1 to about 5;

separating a second fraction of organic solvent and unreacted monomer from said amorphous polymer at a second temperature and a second pressure; and contacting said amorphous polymer with a liquid/gas combination.

16. A method of deactivating a catalyst according to claim 15, wherein contacting said amorphous polymer with a liquid/gas combination is carried out previous to separating a second fraction of solvent and unreacted monomer from said amorphous polymer.

17. A method of deactivating a catalyst according to claim 15 wherein separating a second fraction of solvent and unreacted monomer and contacting said amorphous polymer with a liquid/gas combination are carried out simultaneously.

18. A method of deactivating a catalyst according to claim 15 wherein said liquid/gas combination comprises oxygen in water.

19. A system for catalyst deactivation and polymer stabilization comprising:

at least one first region comprising a dissolved amorphous polymer stream inlet capability and a first volatile diluent-removing capability;

a physical barrier;

at least one second region comprising a second volatile diluent-removing capability; and a third region comprising a liquid/gas-feed capability, wherein said first region causes fractional separation of a first amount of solvent and unreacted monomer from said dissolved amorphous polymer and said catalyst to precipitate said amorphous polymer, wherein said at least one second region causes fractional separation of a second amount of said monomer and solvent from said amorphous polymer and said catalyst, and wherein said second amount is contaminated with monomer and solvent poisons.

20. A system for catalyst deactivation and polymer stabilization according to claim 19, wherein said first amount is greater than said second amount.

21. A system for catalyst deactivation and polymer stabilization according to claim 19, wherein said physical barrier resists transportation of volatile diluents across said physical barrier, and wherein said third region operates in a temperature range above the ambient pressure boiling point of said liquid.

22. A system for catalyst deactivation and polymer stabilization according to claim 19, wherein said catalyst comprises a Ziegler-Natta catalyst, wherein said first region comprises:

a feed zone for the reception of a mixture of polymer, unreacted monomer, solvent, catalyst, and treatment chemicals;

a first zone for operation at a temperature of about 125° C.;

a second zone for volatilization of a fraction of said solvent and said unreacted monomer for operation at a temperature of about 190° C.;

a third zone for operation at a temperature of about 170° C.; and a fourth zone comprising at least one physical barrier between said first region and said second region for operation at a temperature of about 140° C.;

wherein said second region comprises:

a fifth zone for separating a fraction of said solvent and unreacted monomer for operation at a temperature of about 185° C.; and a sixth zone for operation at a temperature of about 155° C.; and wherein said third region comprises:

a seventh zone for reception of air-entrained water for operation at a temperature of about 155° C.; and p1 an eighth zone for operation at a temperature of about 130° C.

23. A system for catalyst deactivation and polymer stabilization according to claim 22, wherein said system comprises a twin screw extruder, and wherein said fourth zone comprises at least one reverse element between at least two blisters.

24. A system for catalyst deactivation and polymer stabilization according to claim 19, wherein said system comprises a means for thin spreading of said polymer, monomer, solvent, and catalyst.

25. A system for catalyst deactivation and polymer stabilization according to claim 19, wherein said system comprises at least two flash vessels and at least one pump therebetween.

* * * * *

UNITED STATES PATENT AND TRADEMARK OFFICE
CERTIFICATE OF CORRECTION

PATENT NO. : 6,160,060
DATED : December 12, 2000
INVENTOR(S) : Holliday et al.

It is certified that error appears in the above-identified patent and that said Letters Patent is hereby corrected as shown below:

Column 15, line 9, change "á-olefin" to "α-olefin" (both places)

Column 15, line 17, change "á-olefin" to "α-olefin"

Column 15, line 21, change "á-olefin" to "α-olefin"

Column 15, line 29, change "á-olefin" to "α-olefin"

Column 15, line 32, change "á-olefin" to "α-olefin"

Column 15, line 36, change "á-olefin" to "α-olefin"

Column 15, line 47, change "á-olefin" to "α-olefin"

Column 18, line 14, remove "p1"

Signed and Sealed this

First Day of May, 2001

*Attest:*

NICHOLAS P. GODICI

*Attesting Officer*   *Acting Director of the United States Patent and Trademark Office*